3,285,921
METAL COMPLEXES OF DITHIOCARBAMATES
Gerhard Ortner and Ferdinand Grewe, Cologne-Stammheim, Germany, assignors to Farbenfabriken Bayer Aktiengesellschaft, Leverkusen, Germany, a German corporation
No Drawing. Filed Nov. 28, 1962, Ser. No. 240,753
Claims priority, application Germany, Nov. 30, 1961, F 35,443
19 Claims. (Cl. 260—270)

The present invention relates to and has as its objects new and useful pesticidal preferably fungicidal compounds. This invention also relates to improvements in fungicidal preparations and more particularly to improved fungicides as well as to methods of protecting organic material against the attack of low orders of organisms, especially of fungi:

More specifically, the present invention has as its objects new technically valuable complex compounds of the following general formula

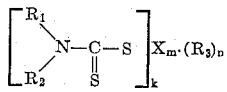

in which $R_1$ and $R_2$ denotes hydrogen, optionally substituted saturated or unsaturated alkyl, cycloalkyl, aralkyl, aryl or heterocyclic radicals. In addition, $R_2$ may also denote a radical of the formula

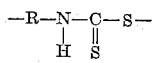

wherein R is an, optionally substituted, alkylene or arylene radical. X represents a bivalent metal ion, while $R_3$ denotes an unsaturated heterocyclic compound, the indices $k$ and $m$ have the value of 1 or 2, and $n$ is an integer of 1 to 3.

Finally this invention is concerned with a process for the production of such compounds.

Dithio- or bis-dithio-carbamates are compounds which have been known for a longer time as having good fungicidal properties and as having been employed as plant protection agents (cf. U.S. patent specifications Nos. 2,317,765 and 2,457,674).

In addition, in the U.S. patent specifications Nos. 2,321,301, 2,588,428, 2,600,245 and 2,604,484 as well as in the German patent application No. 1,054,814 are described complex compounds of zinc mono- or bis-dithiocarbamates and ammonia or aliphatic, araliphatic, or saturated heterocyclic amines. Such compopnds are suitable as pest control agents and also as accelerators for vulcanisation.

In accordance with the present invention it has now been found, that unsaturated heterocyclic compounds, particularly those with a predominantly aromatic character, react with salts of mono- or bis-dithiocarbamic acids to form products of the general formula as given above.

The preparation of the complex compounds according to the present invention is carried out by the reaction of the above-mentioned unsaturated heterocyclic compounds with the corresponding metal salts of dithiocarbamic acids or their ammonia or amine complexes. The following schemes of formulae illustrate the reactions according to the inventive process in more detail.

(1)

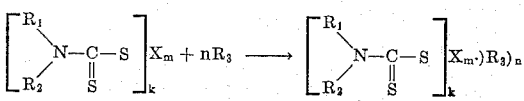

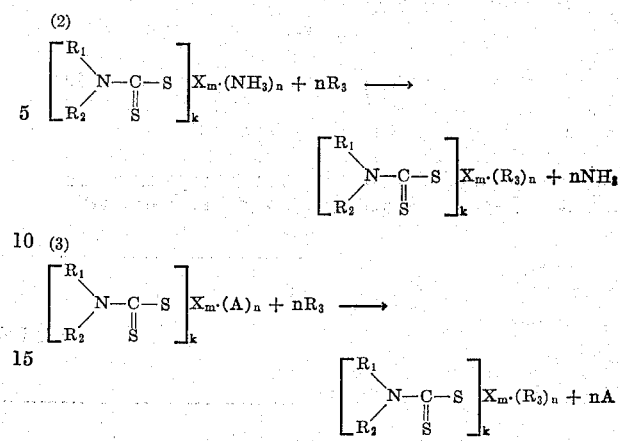

These reaction schemes are only given for the purpose of illustrating the invention and not intended to limit it in any way.

In the above mentioned equations, the symbols $R_1$, $R_2$, $R_3$, X, $k$, $m$, and $n$, possess the same significance as specified above, while A denotes an amine.

As starting materials for the reaction according to the invention, consideration can be given, on the one hand, to the salts formed from the corresponding mono- or bis-dithiocarbamic acids and metals of the 2nd to 8th Transition Groups of the Periodic System, particularly to the zinc, manganous, cadmium, ferrous, cupric, nickel, cobalt, or mercuric salts, and also to their complexes with ammonia or amines.

On the other hand, all the unsaturated mono or polynuclear heterocyclic compounds (particularly those with a predominantly aromatic character), which may contain substitutents as well as one or several like or different heteroatoms (e.g. oxygen, sulphur, or nitrogen), are suitable for the process according to the invention. As examples, there may be mentioned: Pyridine, $\alpha,\beta,\gamma$-picoline, collidine, pyridazine, pyrimidine, pyrazine, triazine, quinoline, isoquinoline, furan, pyran, thiopyran, coumarone, coumaran, coumarin, pyrone, chromene, diphenyl oxide, xanthene, thioxanthene, pyrrole, pyrazole, imidazole, benzimidazole, triazole, benztriazole, tetrazole, indole, carbazole, acridine, phenanthridine, indazole, cinnoline, quinazoline, quinoxaline, phenazine, phenanthroline, purine, thiophene, thionaphthene, oxazole, isoxazole, thiazole, isothiazole, benzoxazole, benzthiazole, phenoxazine, or their substitution products, particularly the corresponding alkyl, cycloalkyl, aralkyl or aryl derivatives.

In most cases, the complex compounds according to the invention can already be prepared by simply mixing and stirring the reaction components at room temperature, if desired with the concurrent use of a solvent. There are obtained mono or higher adducts, depending on the type of salt of dithiocarbamic acid employed as starting material. Those complexes which contain more than 1 mol of the respective heterocyclic compound per mol of salt of dithiocarbamic acid are often unstable, and are converted into the corresponding stable mono-adducts on washing or strong drying or heating of the substances in vacuo. In many cases, the mono-addition compounds can also be obtained by a single step reaction, when the reaction according to the invention is carried out in the presence of water, alcohols, or chlorinated hydrocarbons.

The products of the process are well defined compounds with a semipolar bond between the heteroatoms of the heterocyclic compound and the metal ion of the dithiocarbamate. They are usually obtained in crystalline form and also in very good yields (90–100% of the theoretical amount, according to the purity of the starting components).

As already mentioned above the inventive compounds are distinguished by an outstanding pesticidal, preferably fungicidal activity combined with a good plant tolerance. The substances possess a high initial as well as a long-lasting activity.

Owing to these excellent pesticidal properties, the products are intended for application as pest control and plant protection agents, particularly for controlling the growth of fungi. In this respect the inventive compounds are superior to those of the cited prior art.

From the following experiments there is to be seen the high initial activity of the inventive compounds. The test is a green-house experiment and has been carried out with tomato plants (Bonny best). Aqueous emulsions of the compounds shown in the table below have been prepared by admixing the active ingredient with the same amount of dimethyl formamide and a commercial non-ionic emulsifier (NP10). Plants sprayed with these solutions are inoculated after 24 hours with Zoosporangia of *Phytophthora infestans*, and placed in humidity chambers at a temperature of 20° C. and a relative humidity of 100%. They are kept there for 5 days. After that the infestation has been checked and is shown in the tables below in comparison to an untreated control test, infestation of which is set as 100.

TABLE 1

| Compound | Degree of infestation by *Phytophthora infestans* (in percent) at a concentration of active ingredient (aqueous emulsion) of— | | |
|---|---|---|---|
| | 0.025% | 0.0062% | 0.0031% |
| [(CH₃)₂N—C(=S)—S]₂ Zn · pyridyl | 21 | 42 | 52 |
| [(CH₃)₂N—C(=S)—S]₂ Zn · (methylpyridyl) | 20 | 31 | 38 |
| [(CH₃)₂N—C(=S)—S]₂ Zn · (ethyl-methylpyridyl) | 27 | 46 | ------ |
| [(CH₃)₂N—C(=S)—S]₂ Zn · (methylbenzothiazolyl) | 17 | 38 | ------ |
| [(CH₃)₂N—C(=S)—S]₂ Zn · (aminopyridyl) | 23 | 34 | ------ |
| [(CH₃)₂N—C(=S)—S]₂ Zn | 31 | 53 | 73 |
| According to prior art control (untreated) | ------ | 100 | ------ |

TABLE 2

| Compound | Degree of infestation by *Phytophthora infestans* (in percent) at a concentration of active ingredient (aqueous emulsion) of— | | |
|---|---|---|---|
| | 0.025% | 0.0062% | 0.0031% |
| [S—C(=S)—HN—CH₂—CH₂—NH—C(=S)—S] Zn · pyridyl | 6 | 22 | 40 |
| [S—C(=S)—HN—CH₂—CH₂—NH—C(=S)—S] Zn · (ethylpyridyl)₂ | 0 | 3 | 11 |
| [S—C(=S)—HN—CH₂—CH₂—NH—C(=S)—S] Zn · (methylquinolyl) | ------ | 25 | 49 | above specified mono-pyridine complex compound of zinc bis-[N,N-dimethyldithocarbamate] in the form of a white crystalline substance, which starts to sinter on heating above 235° C.

Example 2

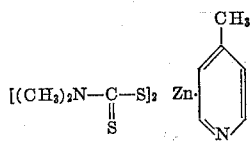

100 g. of zinc bis-[N,N-dimethyldithiocarbamate] are introduced, with stirring, into 600 ml. of a γ-picoline, -water mixture, which contains 30% of γ-picoline, the mixture is thereafter stirred at room temperature for about 2 hours, the reaction product is then filtered off with suction, washed with water and methanol, and dried at 50° C. in a vacuum drying cabinet.

The yield amounts to 124.4 g. (95% of the theoretical of the mono-γ-picoline complex compound of zinc bis-[N,N-dimethyldithiocarbamate]. The white crystalline substance sinters between 158 and 160° C.

Example 3

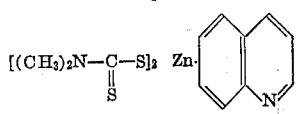

50 g. of zinc bis-[N,N-dimethyldithiocarbamate] are introduced in a three-necked flask fitted with reflux condenser, thermometer, and stirrer, into 200 ml. of methanol with stirring. Thereafter the mixture is treated with 100 ml. of quinoline, whereupon the temperature rises somewhat. After about 2 hours, the reaction mixture is heated to about 50° C., the precipitate thereafter filtered off with suction, washed with methanol, and dried at 50° C. in a vacuum drying cabinet. The yield amounts to 71.8 g. (100% of the theoretical) of the mono-quinoline complex compound of zinc bis-[N,N-dimethyldithiocarbamate]. On heating, the white crystalline substances sinter between 195° and 245° C.

Example 4

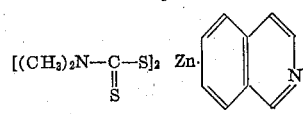

On reaction of 50 g. of zinc bis-[N,N-dimethyldithiocarbamate] with isoquinoline under the reaction conditions specified in Example 3, there are obtained 13.7 g. (96.3% of the theoretical yield) of the mono-isoquinoline complex compound of the above stated formula. The white crystalline substance sinters at 200° C. and forms a clear melt at 210° C.

Example 5

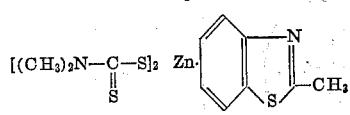

50 g. of zinc bis-[N,N-dimethyldithiocarbamate] are introduced into 200 ml. of methanol, as described in Example 3. This mixture is treated with 100 ml. of 2-methylbenzthiazole, whereupon the reaction mixture is heated at 50° C. for about 2 hours. Thereafter, the separated precipitate is filtered off with suction, washed with methanol, and dried at 50° C. in a vacuum drying cabinet.

The yield amounts to 73.2 g. (98.2% of the theoretical) of the mono-2-methylbenzthiazole complex compound of zinc bis-[N,N-dimethyldithiocarbamate]. The grey crystalline substance starts to sinter slightly at 135° C. and melts together at 175° C.

Example 6

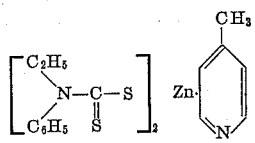

100 g. of zinc bis-[N-ethyl-N-phenyldithiocarbamate] are introduced with stirring into a mixture of 200 ml. of water and 50 ml. of ethanol. Thereafter, the reaction mixture is treated with 350 ml. of pyridine. After 2 hours, the separated solid product is filtered off with suction, washed with water and methanol, and dried at 50° C. in a vacuum drying cabinet.

There are obtained 114.1 g. (97.4% of the theoretical yield) of the mono-pyridine complex compound of zinc bis-[N-ethyl-N-phenyldithiocarbamate] in the form of a white crystalline substance, which sinters from 180° C. and forms a clear melt at 188° C.

Example 7

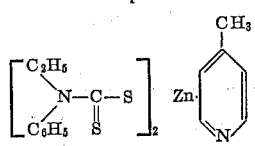

Under reaction conditions analogous to those described in Example 6, there are obtained from 100 g. of zinc bis-[N-ethyl-N-phenyldithiocarbamate] and γ-picoline, 115.2 g. (96.0% of the theoretical amount) of the mono-γ-picoline complex compound of zinc bis-[N-ethyl-N-phenyldithiocarbamate]. The white crystalline substance sinters from 175° C. and forms a clear melt at 188° C.

Example 8

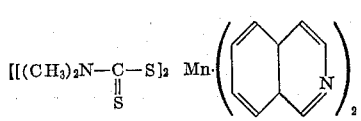

10 g. of manganese bis-[N,N-dimethyldithiocarbamate] are introduced with stirring into a mixture of 50 ml. of isoquinoline, 40 ml. of methanol, 10 ml. of water, and 2 g. of sodium dithionite. Subsequently, the mixture is stirred for 2 hours, the precipitate is thereafter filtered off with suction, washed several times with water and once quickly with methanol, and dried at 50° C. in a vacuum drying cabinet.

The yield amounts to 17.6 g. (93.6% of the theoretical) of the di-isoquinoline complex compound with the above stated formula. The yellow crystalline substance sinters from 145° C. and forms a dark melt at 160° C.

Example 9

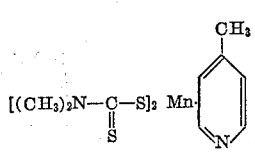

10 g. of manganese bis-[N,N-dimethyldithiocarbamate] are introduced with stirring into a mixture of 50 ml. of γ-picoline, 50 ml. of water, and 2 g. of sodium dithionite, the mixture is treated after 1 hour with 40 ml. of water, and stirred at room temperature for 2 hours altogether. Thereafter, the precipitate is filtered off with suction, washed with water and dried in a vacuum drying cabinet.

The yield amounts to 13.2 g. (100% of the theoretical) of the mono-γ-picoline complex compound of manganese bis-[N,N-dimethyldithiocarbamate], which decomposes on heating from 100° C.

TABLE 2—Continued

| Compound | Degree of infestation by *Phytophthora infestans* (in percent) at a concentration of active ingredient (aqueous emulsion) of— | | |
|---|---|---|---|
| | 0.025% | 0.0062% | 0.0031% |
| [S—C(=S)—HN—CH$_2$—CH$_2$—NH—C(=S)—S] Zn · (pyridine with C$_2$H$_5$ and CH$_3$) | 7 | 31 | 40 |
| [S—C(=S)—HN—CH$_2$—CH$_2$—NH—C(=S)—S] Zn | 11 | 55 | 83 |
| According to prior art control (untreated) | | 100 | |

TABLE 3

| Compound | Degree of infestation by *Phytophthora infestans* (in percent) at a concentration of active ingredient (aqueous emulsion) of— | | |
|---|---|---|---|
| | 0.025% | 0.0062% | 0.0031% |
| [S—C(=S)—HN—CH(CH$_3$)—CH$_2$—NH—C(=S)—S] Zn · (4-methylpyridine) | 0 | 15 | 23 |
| [S—C(=S)—HN—CH(CH$_3$)—CH$_2$—NH—C(=S)—S] Zn · (pyridine) | 1 | 12 | 17 |
| [S—C(=S)—HN—CH(CH$_3$)—CH$_2$—NH—C(=S)—S] Zn | | | |
| According to prior art control (untreated) | 4 | 25 / 100 | 35 |

TABLE 4

| Compound | Degree of infestation by *Phytophthora infestans* (in percent) at a concentration of active ingredient (aqueous emulsion) of— | | |
|---|---|---|---|
| | 0.025% | 0.0062% | 0.0031% |
| [S—C(=S)—HN—CH$_2$—CH$_2$—NH—C(=S)—S] Zn, Mn · (4-methylpyridine)$_2$ | 2 | 31 | 56 |
| [S—C(=S)—HN—CH$_2$—CH$_2$—NH—C(=S)—S] Zn, Mn · (4-methylpyridine) | 0.9 | 17 | 31 |
| [S—C(=S)—HN—CH$_2$—CH$_2$—NH—C(=S)—S] Zn | 11 | 55 | 83 |
| According to prior art control (untreated) | | 100 | |

The following examples illustrate the invention as claimed:

Example 1

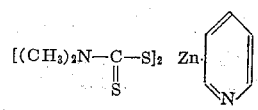

100 g. of zinc bis-[N,N-dimethyldithiocarbamate] are introduced with stirring, into 600 ml. of a pyridine-water mixture, which contains 30% of pyridine. Subsequently, the mixture is stirred at room temperature for about 2 hours, the separated solid product is thereafter filtered off with suction, washed with water and methanol, and dried at 50° C. in a vacuum drying cabinet. There are obtained 120.7 g. (95.6% of the theoretical yield) of the

Example 10

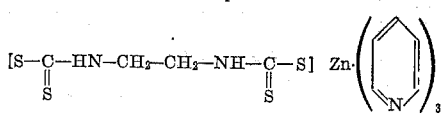

20 g. of 95%* zinc N,N'-ethylene-bis-dithiocarbamate are stirred in 120 ml. of pyridine at room temperature for about 2 hours. Thereafter, the separated precipitate is immediately filtered off with suction, and air is sucked through the filtration residue until the smell of pyridine is hardly noticeable any longer. The reaction product dried in air overnight weighs 31.7 g. and is a white crystalline substance. The tris-pyridine complex compound of the above stated formula is not very stable. The product can be converted into the corresponding mono-pyridine complex of zinc N,N'-ethylene-bis-dithiocarbamate by sharp drying or prolonged washing with alcohol.

Example 11

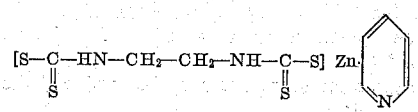

10 g. of 95%* zinc N,N'-ethylene-bis-dithiocarbamate are introduced with stirring into 50 ml. of a pyridine-water mixture, which contains 50% of pyridine, the mixture is stirred at room temperature for about 2 hours, the separated reaction product is rapidly filtered off with suction, washed with water and methanol and dried at 50° C. in a vacuum drying cabinet at a pressure of 200 mm. Hg.

The yield amounts to 12.2 g. (99.5% of the theoretical) of the mono-pyridine complex compound of zinc N,N'-ethylene-bis-dithiocarbamate. The product is obtained in the form of a white crystalline substance which starts to sinter at 145° C. In the same manner there may be produced the following compounds:

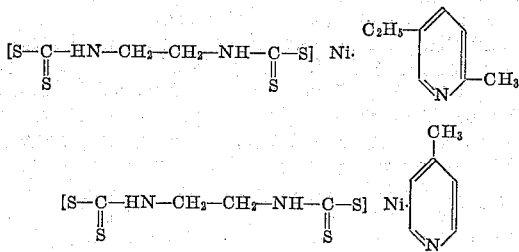

Example 12

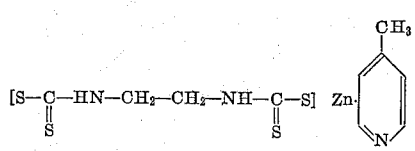

10 g. of 95%* zinc N,N'-ethylene-bis-dithiocarbamate are introduced with stirring into 50 ml. of a γ-picoline-water mixture, which contains 40% of γ-picoline. Subsequently, the reaction mixture is stirred for about 2 hours, the precipitate is thereafter rapidly filtered off with suction, washed with water and methanol, and dried at 50° C. in a vacuum drying cabinet at a pressure of 200 mm. Hg.

The yield amounts to 12.7 g. (100% of the theoretical) of the mono-γ-picoline complex compound of zinc N,N'-ethylene-bis-dithiocarbamate. The white crystalline substance starts to sinter on heating at 135° C.

*The determination of the content of the starting material was carried out by estimating the carbon disulphide which can be split off.

In the same way there may be obtained the following compounds:

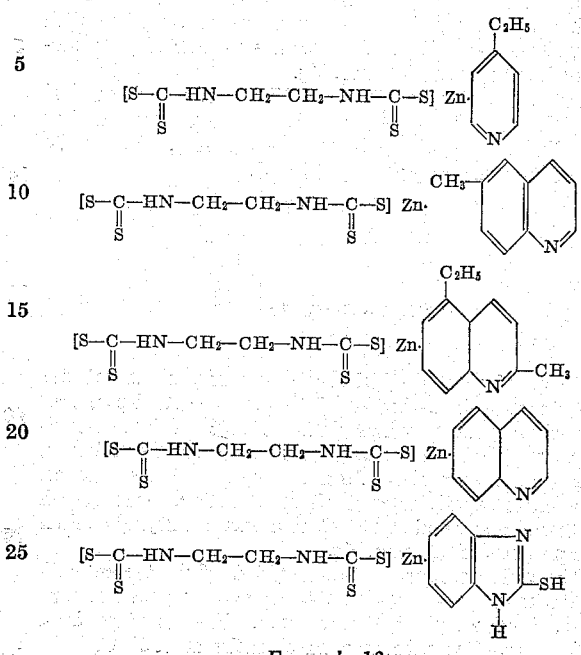

Example 13

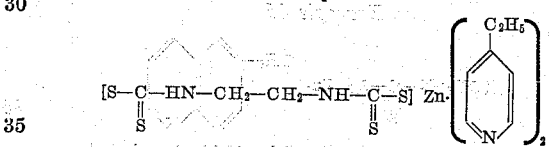

20 g. of zinc bis-[N-ethyl-N-phenyldithiocarbamate] are are introduced with stirring into 100 ml. of a γ-ethyl-pyridine-methanol mixture, which contains 70% of γ-ethylpyridine. Thereafter, the mixture is stirred for about 3 hours, the precipitated reaction product rapidly filtered off with suction, washed with methanol and dried at 50° C. in a vacuum drying cabinet at a pressure of 200 mm. Hg.

The yield amounts to 29.7 g. (98.5% of the theoretical referred to the 85% starting material) of the di-γ-ethyl-pyridine complex compound of zinc N,N'-ethylene-bis-dithiocarbamate.

The white crystalline substance starts to sinter on heating at 135° C.

By exactly the same methods there may be obtained the following compounds:

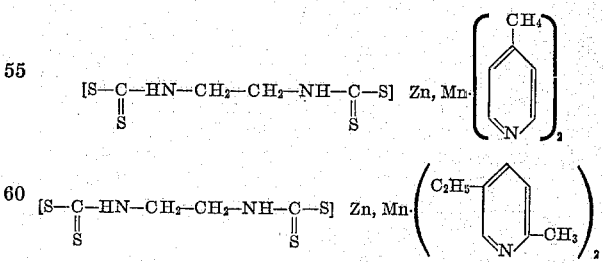

Example 14

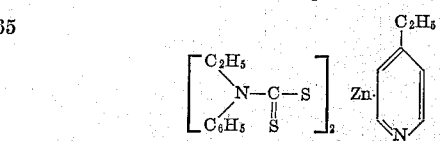

20 g. of zinc bis-[N-ethyl-N-phenyldithiocarbamate] are introduced with stirring into 100 ml. of a γ-ethyl-pyridine-

*The determination of the content of the starting material was carried out by estimating the carbon disulphide which can be split off.

methanol mixture, which contains 60% of γ-ethyl-pyridine. The reaction mixture is stirred for about 3 hours, then diluted with 50 ml. of methanol, the separated precipitate is rapidly filtered off with suction, washed with methanol, and dried at 50° C. in a vacuum drying cabinet at a pressure of 200 mm. Hg.

There are obtained 24.1 g. (97.8% of the theoretical yield) of the mono-γ-ethylpyridine complex compound of zinc bis-[N-ethyl-N-phenyldithiocarbamate]. The white crystalline substance melts at 176° C.

*Example 15*

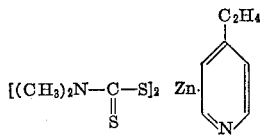

20 g. of zinc bis-[N,N-dimethyldithiocarbamate] are introduced with stirring into 100 ml. of a γ-ethyl-pyridine-methanol mixture, which contains 30% of γ-ethyl-pyridine, the mixture is thereafter stirred for another 3 hours, then diluted with about 50 ml. of methanol, the reaction product is rapidly filtered off with suction, washed with methanol and dried at 50° C. in a vacuum drying cabinet at a pressure of 200 mm. Hg.

The yield amounts to 24.6 g. (91% of the theoretical) of the mono-γ-ethylpyridine complex compound of zinc bis-[N,N-dimethyldithiocarbamate]. The product is a white crystalline substance which melts at 132° C.

*Example 16*

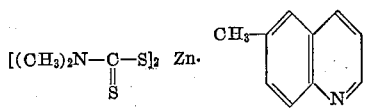

On reaction of 20 g. of zinc bis-[N,N-dimethyl-dithiocarbamate] with 100 ml. of a 6-methylquinoline methanol mixture, containing 70% of 6-methylquinoline, by a method analogous to that described in Example 15, there are obtained 28.3 g. (96.5% of the theoretical yield) of the mono-6-methylquinoline complex compound of zinc bis-[N,N-dimethyldithiocarbamate] in the form of a white crystalline substance, which melts at 146° C.

*Example 17*

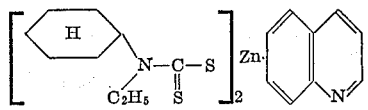

10 g. of zinc bis-[N-ethyl-N-cyclohexyldithiocarbamate] are added with stirring to 100 ml. of methanol, and this mixture is treated dropwise with 50 ml. of quinoline. After 3 hours the reaction mixture is diluted with 100 ml. of a methanol-water mixture containing 50% of methanol, the precipitate is rapidly filtered off with suction, washed with methanol, and dried at 50° C. in a vacuum drying cabinet at a pressure of 200 mm. Hg. The yield amounts to 12.0 g. (94.1% of the theoretical) of the mono-quinoline complex compound of zinc bis-[N-ethyl-N-cyclohexyldithiocarbamate] of melting point 105° C.

*Example 18*

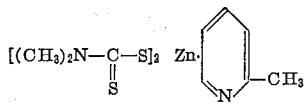

20 g. of zinc bis-[N,N-dimethyldithiocarbamate] are introduced with stirring into 100 ml. of an α-picoline-methanol mixture, which contains 50% of α-picoline. Thereafter, the mixture is stirred at 50° C. for about 2 hours, the precipitate is then immediately filtered off with suction, washed with methanol, and dried at 50° C. in a vacuum drying cabinet at a pressure of 200 mm. Hg. There are obtained 22 g. (85% of the theoretical amount) of the mono-α-picoline complex compound of zinc bis-[N,N-dimethyldithiocarbamate]. The white crystalline substance sinters from 235° C. and melts at 250° C.

*Example 19*

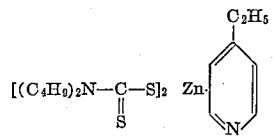

10 g. of zinc bis-[N,N-dibutyldithiocarbamate] are introduced with stirring into a mixture of 100 ml. of methanol and 25 ml. of γ-ethylpyridine, and the reaction mixture is subsequently stirred for 2 hours. Thereafter, it is diluted dropwise with water, the separated precipitate filtered off with suction, washed with a methanol-water mixture containing 50% of methanol, and dried at 50° C. in a vacuum drying cabinet at a pressure of 200 mm. Hg.

The yield amounts to 12.8 g. (97.8% of the theoretical) of the mono-γ-ethylpyridine complex compound of zinc bis-[N,N-dibutyldithiocarbamate]. The white crystalline substance melts at 65° C. and decomposes from 200° C.

In the same manner there may be produced the following compound:

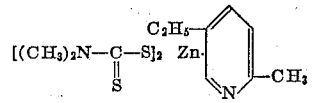

*Example 20*

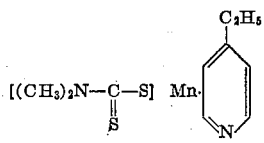

10 g. of manganese bis - [N,N-dimethyldithiocarbamate] are introduced with stirring into 40 ml. of γ-ethylpyridine. Thereafter, the reaction mixture is stirred for 2 hours, the separated precipitate then rapidly filtered off with suction and dried. The yield of the crude product amounts to 16 g. The brownish-yellow substance loses some weight on sharp drying in a vacuum drying cabinet.

There are obtained 12.2 g. (90% of the theoretical yield) of the mono-γ-ethylpyridine complex compound of manganese bis-[N,N-dimethyldithiocarbamate]. On heating, the substance starts to decompose from 100° C.

By analogous methods there may be obtained the following compound:

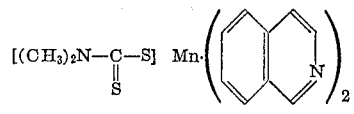

*Example 21*

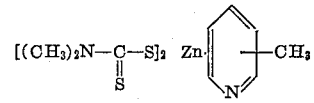

200 g. of zinc bis-[N,N-dimethyldithiocarbamate] are introduced with stirring into a mixture of 500 ml. of water and 200 ml. of methanol. Thereafter, the reaction mixture is treated with 300 ml. of a fraction of pyridine bases boiling at 130 to 140° C., which mainly consists of β-picoline. The separated solid product is filtered off with suction after 2½ hours, washed with water and methanol, and dried at 50° C. in a vacuum drying cabinet at 200 mm. Hg.

The yield amounts to 251 g. (95.8% of the theoretical) of the mono-methylpyridine complex compound of zinc bis-[N,N-dimethyldithiocarbamate].

By the same methods there may be obtained the following compounds:

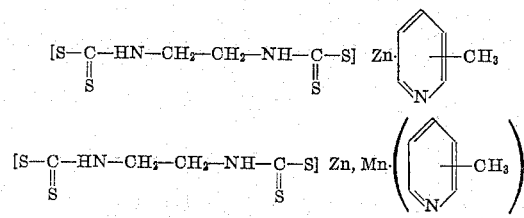

*Example 22*

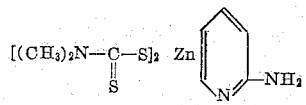

A mixture of 20 g. zinc bis-[N,N-dimethyldithiocarbamate], 20 g. α-aminopyridine, 50 ml. methanol, and 50 ml. water is stirred at 50° C. for 2 hours. Subsequently, the separated precipitate is filtered off with suction, washed with water and methanol, and dried at 50° C. in a vacuum drying cabinet. There are obtained 25.4 g. (97% of the theoretical yield) of the mono-α-aminopyridine complex compound of zinc bis-[N,N-dimethyldithiocarbamate].

*Example 23*

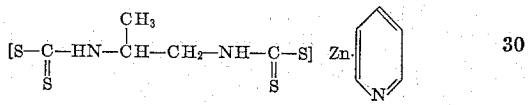

A solution of 10 g. of 85%* zinc N,N'-isopropylene-bis-dithiocarbamate in 50 ml. of pyridine is first allowed to stand at room temperature for half an hour, and subsequently it is added dropwise with stirring to 50 ml. of water. Thereafter, the mixture is stirred for another hour, the separated reaction product is filtered off with suction, washed with water and methanol, and dried at 50° C. in a vacuum drying cabinet.

The yield amounts to 10.1 g. (93% of the theoretical referred to the 85% starting substance) of the mono-pyridine complex compound of zinc N,N'-isopropylene-bis-dithiocarbamate.

By the same methods there may be prepared the following compounds:

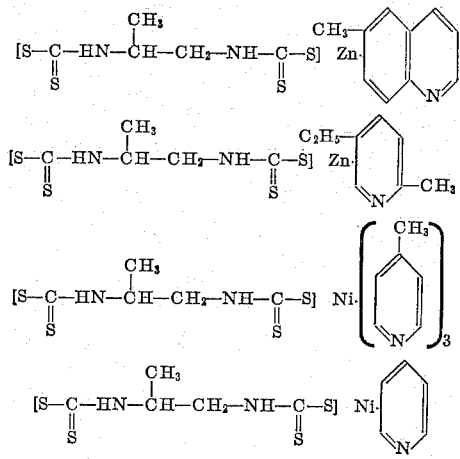

*Example 24*

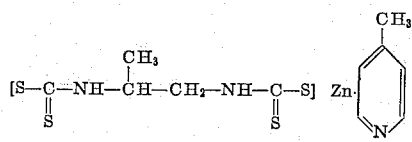

---
* The determination of the content is carried out by estimating the carbon disulphide which can be split off.

10 g. of 85% zinc N,N'-isopropylene-bis-dithiocarbamate are dissolved in 50 ml. of γ-picoline, and the reaction mixture is worked up as described in Example 23.

There are obtained 11.2 g. (100% of the theoretical yield referred to the 85% starting substance) of the mono-γ-picoline complex compound of zinc N,N'-isopropylene-bis-dithiocarbamate.

In the same manner there may be produced the following compounds:

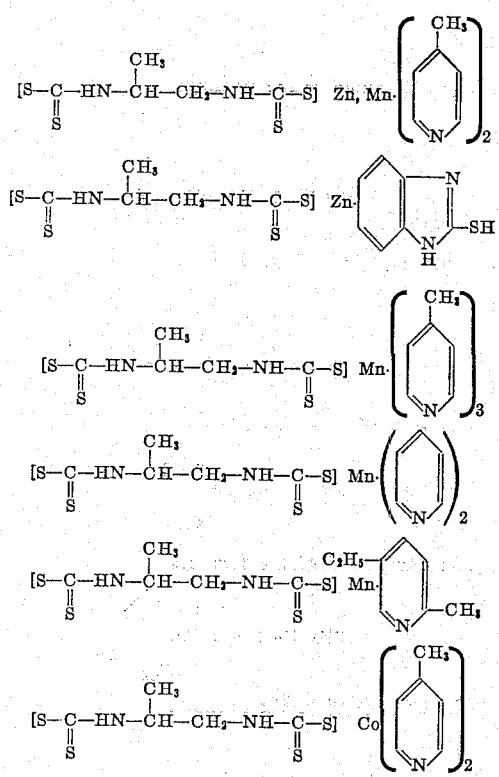

*Example 25*

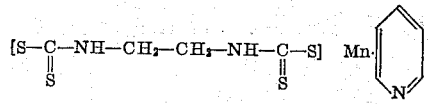

20 g. of manganese N,N'-ethylene-bis-dithiocarbamate are introduced with stirring into 100 ml. of pyridine-water mixture, which contains 50% of pyridine. Subsequently, the reaction mixture is stirred at 50° C. for 2 hours, the separated precipitate is thereafter filtered off with suction, the filtration residue is washed with water, and dried at 50° C. in a vacuum drying cabinet at a pressure of 200 mm. Hg.

The yield amounts to 23.5 g. (90% of the theoretical) of the mono-pyridine complex compound of manganese N,N'-ethylene-bis-dithiocarbamate.

In the same way there may be produced the following compounds:

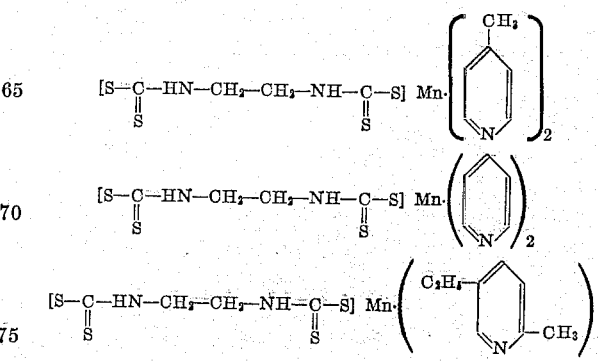

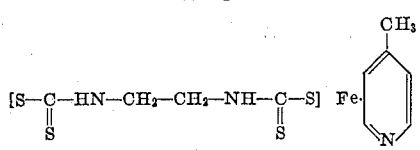

We claim:
1. The compound of the formula

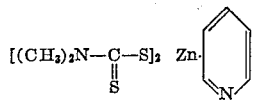

2. The compound of the formula

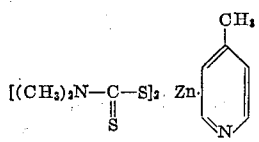

3. The compound of the formula

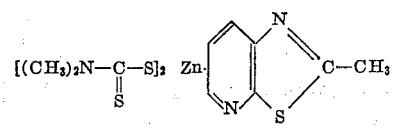

4. The compound of the formula

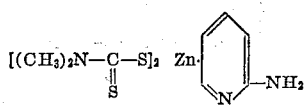

5. The compound of the formula

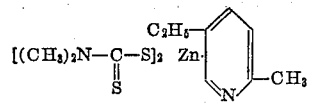

6. The compound of the formula

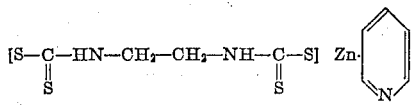

7. The compound of the formula

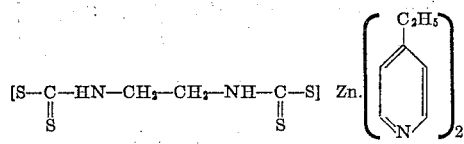

8. The compound of the formula

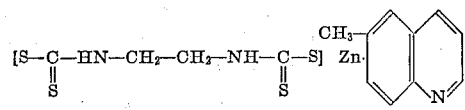

9. The compound of the formula

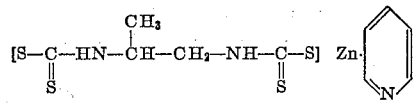

10. The compound of the formula

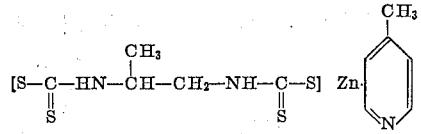

11. Complex compound of the formula

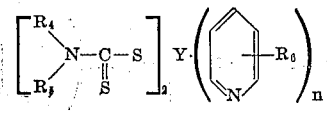

in which $R_4$ is a member selected from the group consisting of lower alkyl of 1–4 carbon atoms, cyclohexyl and phenyl; $R_5$ is a member selected from the group consisting of lower alkyl containing 1–4 carbon atoms; Y is a zinc metal ion; $R_6$ is a member selected from the group consisting of hydrogen, lower alkyl containing 1–4 carbon atoms and amino; and $n$ is an integer of 1–3.

12. Complex compound of the formula

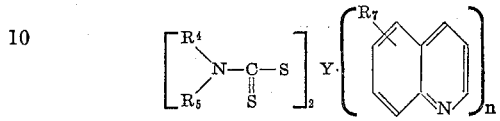

in which $R_4$ is a member selected from the group consisting of lower alkyl containing 1–4 carbon atoms, cyclohexyl and phenyl; $R_5$ is a member selected from the group consisting of lower alkyl containing 1–4 carbon atoms; $R_7$ is a member selected from the group consisting of hydrogen and methyl and $n$ is an integer of from 1–3 and Y is a metal ion selected from the group consisting of zinc and manganous ions.

13. Complex compound of the formula

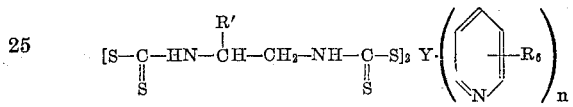

in which $R'$ is a member selected from the group consisting of hydrogen and methyl; $R_6$ is a member selected from the group consisting of hydrogen, lower alkyl containing 1–4 carbon atoms, and amino; Y is a zinc metal ion; and $n$ is an integer of 1–3.

14. Complex compound of the formula

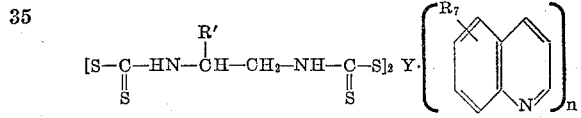

in which $R'$ is a member selected from the group consisting of hydrogen and methyl; $R_7$ is a member selected from the group consisting of hydrogen and methyl; $n$ is an integer of 1–3, and Y is a metal ion selected from the group consisting of zinc and manganous ions.

15. Complex compound of the formula

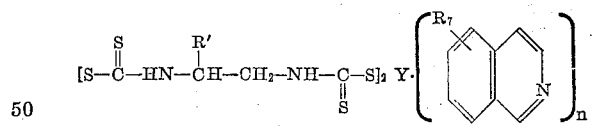

in which $R'$ is a member selected from the group consisting of hydrogen and methyl; $R_7$ is a member selected from the group consisting of hydrogen and methyl; $n$ is an integer of 1–3, and Y is a metal ion selected from the group consisting of zinc and manganous ions.

16. Complex compounds of the formula

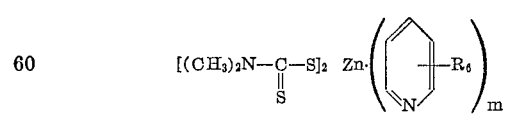

in which $R_6$ is a member selected from the group consisting of hydrogen, lower alkyl, containing 1–4 carbon atoms and amino; and $m$ is an integer of 1–2.

17. Complex compound of the formula

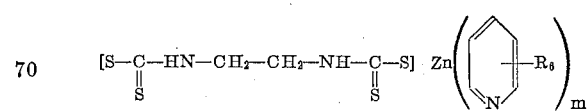

in which $R_6$ is a member selected from the group consisting of hydrogen, lower alkyl containing 1–4 carbon atoms and amino; and $m$ is an integer of 1–2.

18. Complex compound of the formula

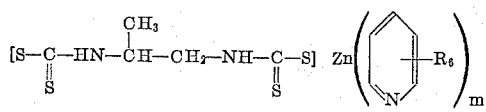

in which $R_6$ is a member selected from the group consisting of hydrogen, lower alkyl containing 1–4 carbon atoms and amino; and $m$ is an integer of 1–2.

19. Complex compound of the formula

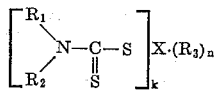

in which $R_1$ is a member selected from the group consisting of hydrogen, lower alkyl containing 1–4 carbon atoms, cyclohexyl and phenyl; $R_2$ is a member selected from the group consisting of lower alkyl containing 1–4 carbon atoms, and

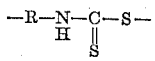

wherein R is a member selected from the group consisting of lower alkylene containing 1–3 carbon atoms; $R_3$ is a member selected from the group consisting of pyridine, lower alkyl substituted pyridine and di-lower-alkyl-substituted pyridine, the lower alkyl moiety having 1–4 carbon atoms, amino substituted pyridine, quinoline, isoquinoline, methylquinoline, benthiazolone, methylbenzthiazole and benzimidazole; X is a metal ion selected from the group consisting of zinc, manganous, ferrous, nickel and cobalt ions; $k$ is an integer of 1–2 and $n$ is an integer of 1–3.

References Cited by the Examiner

UNITED STATES PATENTS 2,588,428  3/1952  Stewart et al. _____ 167—22
2,805,996  9/1957  Deger _____ 167—22

ALEX MAZEL, *Primary Examiner.*

JOHN D. RANDOLPH, NICHOLAS S. RIZZO, HENRY R. JILES, *Examiners.*

D. M. KERR, D. G. DAUS, *Assistant Examiners.*